United States Patent

[11] 3,633,746

[72] Inventor Melvin L. Dieterich
North Olmsted, Ohio
[21] Appl. No. 848,029
[22] Filed Aug. 6, 1969
[45] Patented Jan. 11, 1972
[73] Assignee The Standard Products Company
Cleveland, Ohio

[54] WASTE-DISPOSAL SYSTEM AND METHOD
12 Claims, 5 Drawing Figs.
[52] U.S. Cl.................................................. 210/71,
210/152, 210/181
[51] Int. Cl..................................................... B01d 21/00
[50] Field of Search............................................ 210/71,
152, 181, 109, 110, 149; 4/8, 131; 110/9

[56] References Cited
UNITED STATES PATENTS
3,342,337 9/1967 Reid............................. 210/152
3,357,381 12/1967 Stevens........................ 110/9
3,504,797 4/1970 Reid............................. 210/152

Primary Examiner—John Adee
Attorney—Meyer, Tilberry and Body

ABSTRACT: A human conveyance has a fuel-burning engine and a toilet which discharges to a waste storage tank. Effluent from the storage tank is fed to an evaporating device where the effluent is subjected to a first temperature which evaporates the effluent to form effluent vapor. The effluent vapor is directed to a second heating device which subjects the waste temperature to a second temperature substantially greater than the evaporating temperature. The heating device which subjects the effluent vapor to the second temperature may be defined by the intake or exhaust ports of the fuel-burning engine.

PATENTED JAN 11 1972
3,633,746
SHEET 1 OF 2
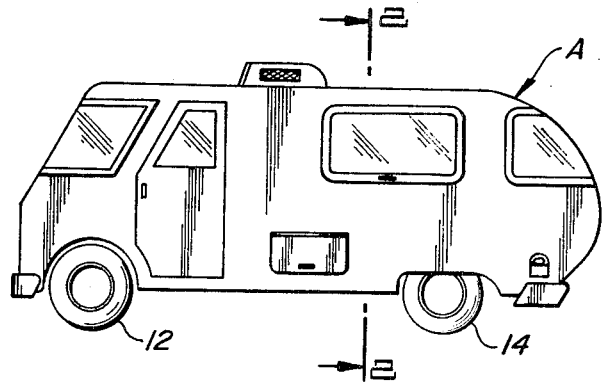
Fig. 1
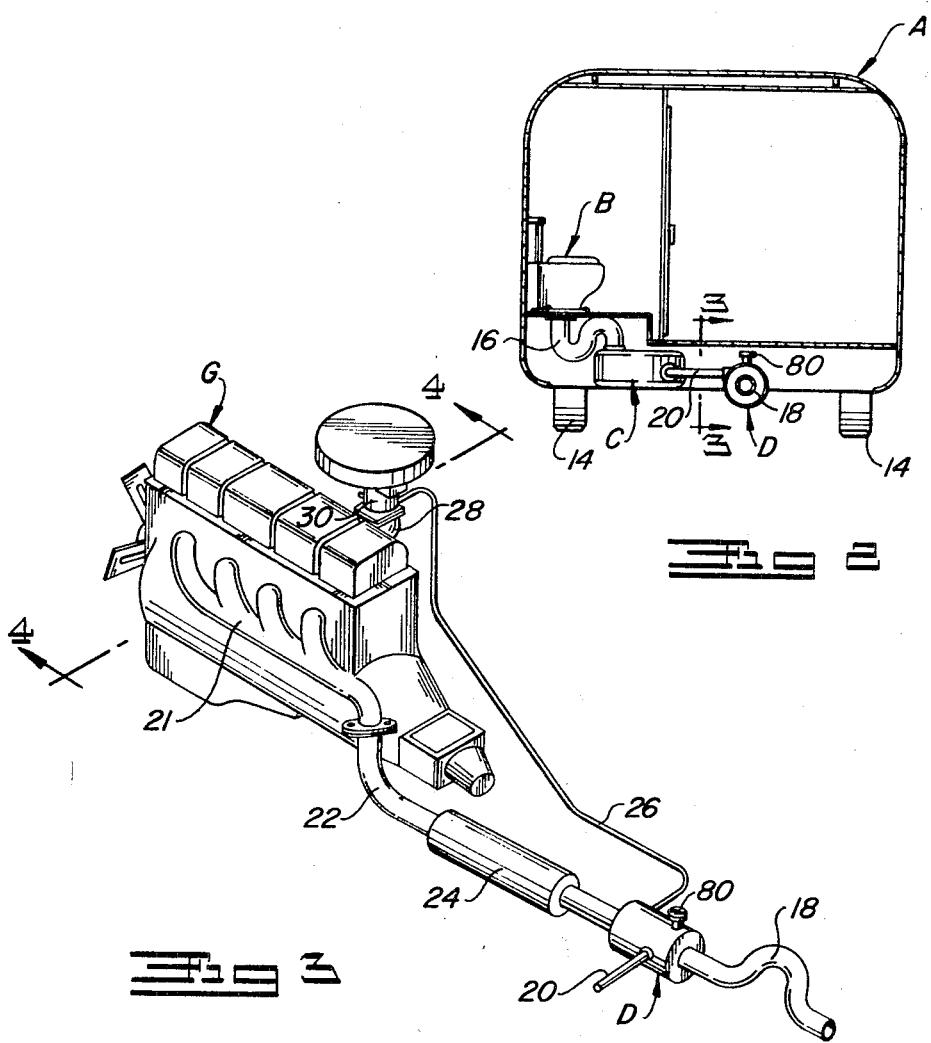
Fig. 2
Fig. 3
INVENTOR.
MELVIN L. DIETERICH
BY
Meyer, Tillerry & Body
ATTORNEYS

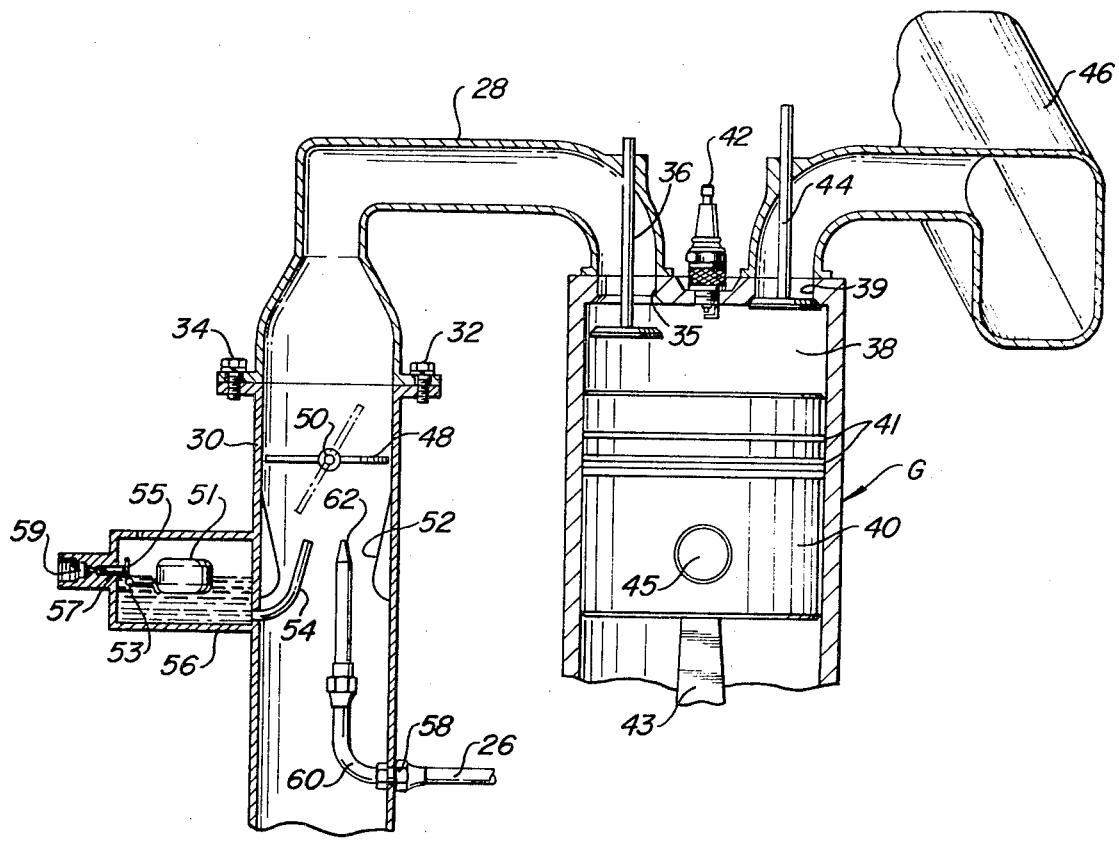
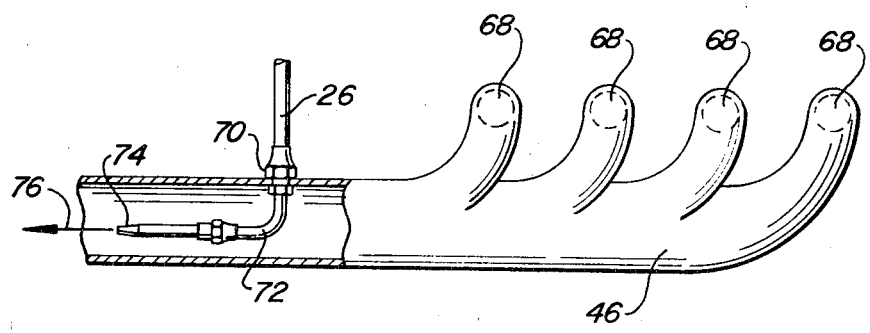
INVENTOR
MELVIN L. DIETERICH
BY
Meyer, Tilberry & Body
ATTORNEYS 3,633,746

WASTE-DISPOSAL SYSTEM AND METHOD

BACKGROUND OF THE INVENTION

This application pertains to the art of waste disposal and more particularly to disposal of human waste on a human conveyance. The invention is particularly applicable to camping vehicles, buses, boats or aircraft and will be described with particular reference to a vehicle such as a camping trailer although it will be appreciated that the invention may be used with other conveyances as well.

Modern human conveyances, such as buses, aircraft, boats, and camping trailers or camping vehicles, commonly have toilets installed therein. Such conveyances commonly have a holding or storage tank for receiving waste from the toilet. Disposing of waste material from the storage tank is a very difficult problem because convenient locations are not available for discharging waste from the holding tank for delivery to a sewage-treating facility. Discharging of the waste material into a body from a boat creates a serious pollution problem which damages recreational facilities along a waterway and is harmful to human health. Discharging such waste material from a camping conveyance onto the ground in a wilderness area renders the area noxious to later visitors. In addition, most vehicles of the type under discussion are very compactly arranged and space is at a premium. As a consequence, waste storage tanks may have a capacity sufficient to contain only that amount of waste produced over a period of 1 or 2 days.

Prior disclosures have suggested the concept of delivering liquid effluent from the storage tank into a boiler where the effluent is heated and evaporated. Such prior disclosures suggest that the vapor be discharged from the boiler directly into the atmosphere or into the tailpipe of an exhaust system from a fuel-burning engine on the conveyance. Such vapor in this prior type of device is heated to only around 212° F., and contains bacteria and odor producing compounds. One prior arrangement of this type is disclosed in U.S. Pat. No. 3,342,337 to Reid.

It would be desirable to subject the evaporated effluent to a second temperature substantially greater than the evaporating temperature so that the vapor would be substantially sterilized. Such sterilization would destroy substantially all of the bacteria contained in the effluent vapor and would break down the odor producing compounds. It would also be desirable to accomplish this by utilizing existing heat sources on conventional conveyances.

SUMMARY OF THE INVENTION

In accordance with the present invention, an existing heat source on a human conveyance is utilized to sterilize waste vapor which is produced from effluent in a waste storage tank for a toilet on the conveyance. More specifically, effluent from the waste storage tank is heated to a boiling temperature to produce effluent vapor. In accordance with one aspect of the invention, the effluent vapor is directed to conduit means to the intake port of a fuel burning engine which provides motive power to the conveyance. Such vapor is fed into the combustion chamber of the engine where temperatures may momentarily be as high as 5,000°–6,000° F. At such temperatures, the effluent vapor is completely vaporized and sterilized to rid it of any harmful bacteria and to substantially reduce the odor producing compounds in the vapor. In accordance with another aspect of the invention, the effluent vapor is fed into the exhaust stream from the fuel burning engine at a point directly adjacent the exhaust ports from the engine. Directly adjacent the exhaust ports, the exhaust gases are commonly at a temperature of 1,200°–1,300° F. and the waste vapor is heated during its entire course of travel through the exhaust system of the fuel-burning engine. While the exhaust gases are at an extremely high temperature immediately upon exiting from the combustion chamber of a fuel-burning engine, such gases may lose substantially over one-half of their heat by radiation and conduction into the walls of the exhaust system before being discharged to atmosphere. Therefore, directing effluent vapor into a tailpipe of an exhaust system from a fuel burning engine offers very little secondary sterilization effect because exhaust gases in the tailpipe are at a very low temperature and the discharge to atmosphere is a very short distance from the tailpipe. Feeding the effluent vapor to a point directly adjacent the exhaust port of the fuel-burning engine subjects the effluent vapor to the high temperature of the exhaust gases before any of the heat is lost. In addition, the effluent vapor travels through the entire exhaust system so that it is subjected to a sterilizing temperature over a substantially greater period of time then if it is simply directed into the tailpipe of the exhaust system.

The improvements of the present invention are useful with conveyances supplied with motive power from fuel burning engines of the type known as spark ignition, compression ignition or turbine. While the invention is described with reference to conveyances having self-contained fuel-burning engines, it will be recognized that conduit means may be used to connect a storage tank in a trailer with the motive power engine in a separate vehicle used to tow the trailer.

It is a principle object of the present invention to sterilize effluent vapor which is produced by boiling waste effluent from a storage tank for toilet waste on a human conveyance.

It is another object of the present invention to sterilize such effluent vapor by utilizing existing heat sources on conventional human conveyances.

It is also an object of the present invention to utilize the heat produced in a fuel-burning engine for subjecting the effluent vapor to a sterilizing temperature.

It is a further object of the present invention to provide an improved method for disposing of human waste on a human conveyance equipped with a toilet.

BRIEF DESCRIPTION OF THE DRAWING

The invention may take physical form in certain parts and arrangements of parts, preferred embodiments of which will be described in detail in this specification and illustrated in the accompanying drawings which form a part hereof.

FIG. 1 is a side-elevational view of a human conveyance having the present invention incorporated therein;

FIG. 2 is a cross-sectional elevational view looking in the direction of arrows 2—2 of FIG. 1;

FIG. 3 is a partial cross-sectional perspective view looking in the direction of arrows 3—3 of FIG. 2;

FIG. 4 is a partial cross-sectional view looking in the direction of arrows 4—4 of FIG. 3; and FIG. 5 is a partial cross-sectional view showing a modified construction of the present invention.

DESCRIPTION OF THE PREFERRED EMBODIMENTS

Referring now to the drawings, wherein the showings are for purposes of illustrating preferred embodiments of the invention only and not for purposes of limiting same, FIG. 1 shows a vehicle A which is intended for occupancy by humans and travels on wheels 12 and 14. Human conveyance A includes a suitable source of motive power such as an internal combustion engine which provides driving power to wheels 12 or 14. While conveyance A has been shown as a camping type of vehicle it will be recognized that the present invention may be incorporated in other human conveyances such as boats, buses, or aircraft.

In accordance with the invention, conveyance A includes a toilet B having a discharge outlet 16 leading to a holding tank C for waste deposited in toilet B. A boiler device D is provided surrounding tailpipe 18 of an exhaust system from an internal combustion engine mounted in conveyance A. A transfer conduit 20 leads from holding tank C to boiler D. It will be recognized that waste deposited in holding tank C undergoes aerobic or anaerobic action so that the waste material is substantially liquified before delivery to boiler D. Transfer conduit 20 may include suitable valves, pumping devices and filter means in a manner more fully described in the aforementioned U.S. patent to Reid.

As described in the aforementioned Reid patent, boiler D may be heated by an electrical heating device, by a gas burner device, by heat transfer from tailpipe 18, or by a combination of two or more of such heating devices.

In accordance with the present invention, waste material transferred from holding tank C through transfer conduit 20 to boiler D is heated to a boiling temperature so that waste vapors are formed. Such waste vapors commonly contain bacteria and odor-producing elements which make it undesirable to transfer such vapor directly to atmosphere. As is well known, an internal combustion engine may produce momentary temperatures as high as 5,000°–6,000° F. within the combustion chamber. A good deal of this heat is immediately dissipated by means of the cooling jacket arrangement provided on such engines. Therefore, the exhaust valves on such an engine commonly operate at around 1,200° F. As shown in FIG. 3, internal combustion engine G of conveyance A is commonly provided with an exhaust manifold 21, exhaust pipe 22, muffler 24 and tailpipe 18. While the temperature of gases escaping through the exhaust valves of engine G is extremely high immediately upon exiting from the combustion chambers, these gases progressively lose a good deal of their heat due to absorption by exhaust manifold 21, exhaust pipe 22 and muffler 24 so that tailpipe 18, and the exhaust gases flowing therethrough, are at a substantially lower temperature than the exhaust gases flowing through the exhaust manifold.

In accordance with an aspect of the invention, boiler D is provided with a conduit 26 communicating with the intake manifold 28 of engine G. As commonly provided, a carburetor 30 is connected with intake manifold 28 for supplying fuel and air to the combustion chambers of engine G. Carburetor 30 is suitably bolted to intake manifold 28 as by bolts 32 and 34 in a conventional manner. Intake manifold 28 leads to an inlet port 35 past intake valve 36 leading to combustion chamber 38 which contains a reciprocating piston 40 and a spark producing device 42. Piston 40 has conventional rings 41 and a crank rod 43 pivotally connected at 45. Combustion chamber 38 includes an exhaust port 39 passing exhaust valve 44 leading to an exhaust manifold 46 which communicates with exhaust pipe 22 of FIG. 3. In accordance with the invention, carburetor 30 is provided with a throttle 48 pivoted on a suitable pin 50. Carburetor 30 is provided with a venturi throat 52 having a fuel nozzle 54 positioned therein. Fuel nozzle 54 communicates with a fuel supply container 56 in a known manner. Container 56 includes a float 51 pivoted at 53 and arm 55 cooperating with valve 57 positioned in fuel inlet port 59 in a known manner. As is well known, throttle 48 is connected through a suitable linkage to an operator-controlled throttling device for pivoting throttle 48 to various positions, only one of which is shown in shadow lines in FIG. 4. Opening of throttle 48 establishes fluid flow between intake manifold 28 and carburetor venturi 52 and the flow of air aspirates fuel from nozzle 54 into the combustion chamber of engine G. In accordance with the invention, conduit 26 from boiler D is connected by a suitable threaded coupling 58 to carburetor 30, and communicates with an elbow 60 which terminates in a nozzle 62 positioned in venturi throat 52 of carburetor 30. While an updraft-carburetion system has been shown for simplicity of illustration, it will be recognized that downdraft carburetion of fuel injection may also be used with the present invention.

In operation, waste liquid delivered from holding tank C through transfer conduit 20 to boiler D is first heated to a boiling temperature to produce waste vapor. When engine G is operating, the vacuum in carburetor venturi throat 52 draws a vacuum through nozzle 62 and line 26 so that vapors are drawn from boiler D into combustion chamber 38 of engine G. The amount of vacuum produced in carburetor venturi throat 52 depends upon the opening of throttle 48. Therefore, the amount of vapor aspirated through nozzle 62 will vary in accordance with the setting of throttle 48. With such an arrangement, the amount of waste liquid aspirated through nozzle 62 will depend upon the operating speed of engine G. When engine G is coasting and throttle 48 is completely closed, a very high vacuum is produced in intake manifold 28. However, positioning nozzle 62 ahead of throttle 48 prevents aspiration of waste liquid into combustion chamber 38 of engine G when firing is not taking place. This prevents flooding of combustion chamber 38 with substantial amounts of waste liquid when engine G is operating at such a speed that the waste vapor cannot be easily disposed of.

In accordance with another aspect of the invention, exhaust manifold 46 is connected by laterals 68 to a plurality of combustion chambers 38 in engine G. Conduit 26 from boiler D is connected with exhaust manifold 46 by suitable threaded coupling 70 and conduit 26 communicates through elbow 72 with aspirating nozzle 74. The venturi action produced by exhaust gases flowing through exhaust manifold 46 in the direction of arrow 76 causes vapor to be aspirated through conduit 26 into exhaust manifold 46 where the vapor is subjected to a temperature of around 1,200° F. The vapor aspirated through nozzle 74 is subjected to a high temperature during its entire travel through exhaust manifold 46, exhaust pipe 22, muffler 24 and tailpipe 18. Subjecting the waste vapor to this high temperature directly within the exhaust manifold substantially eliminates bacteria and odor-producing elements in the vapor before delivery to atmosphere through tailpipe 18. Boiler D includes a top vent 80 which is open to atmosphere so that the vacuum produced in conduit 26 will normally produce a flow of air into vent 80 through boiler D. Vent 80 also provides an escape path for vapor from boiler D when throttle 48 is closed and a vacuum is not being drawn through conduit 26.

While a spark-ignition-type of engine has been shown and described, those skilled in the art will readily be aware that the present invention may be used with other types of engines such as a compression ignition engine or a turbine engine. In addition, it will be recognized that it is possible to place a valve in conduit 26 which is controlled by the throttle linkage so that such a valve will be open a degree proportional to the throttle setting for the fuel mixture. It is also possible to place a temperature control device in conduit 26 so that vapor will be fed to the engine only when it has reached normal operating temperature. However, in a preferred embodiment of the present invention, heat from the engine is used to boil effluent in boiler D and vapor will not normally pass through conduit 26 until the engine has already reached operating temperature. While the preferred embodiment of the present invention uses heat from a fuel burning engine to super heat the effluent vapor, it will be recognized that the method of the present invention may be carried out by following other procedures. For example, it is possible to place an induction coil around conduit 26 in order to super heat vapor passing therethrough so that bacteria and odor producing compounds in the effluent vapor are substantially destroyed. It is also possible to have a separate gas burner and to form conduit 26 into a coil so that effluent vapor must pass through a super heated section of conduit 26 where the vapor is heated to a temperature of over 1,000° F.

While the invention has been described with reference to a preferred embodiment, it is obvious that modification and alterations will occur to others upon the reading and understanding of this specification.

Having thus described my invention, I claim:

1. A waste-disposal system including a heat-producing fuel-burning engine having an exhaust system for discharging hot gases from said engine, waste tank means for receiving liquid and organic waste material, vaporizing means for vaporizing said waste material, flow means for feeding waste material from said waste tank means to said vaporizing means, heat transfer means for transferring heat from hot gases flowing through said exhaust system to said vaporizing means to vaporize waste material in said vaporizing means, said hot gases giving up heat to said vaporizing means and having a substantially lower temperature downstream of said vaporizing means than upstream of said vaporizing means, said vaporizing means having an outlet for vapor produced therein, conduit means connecting said outlet of said vaporizing means with a heat source produced by said engine, said heat source being at a substantially greater temperature than said hot gases downstream of said vaporizing means to expose vapor exhausted from said vaporizing means to a temperature substantially greater than the temperature of said vaporizing means and of said hot gases downstream of said vaporizing means.

2. The device of claim 1 wherein said engine has an intake manifold and an exhaust manifold and said conduit means is connected to deliver vapor from said vaporizing means to one of said manifolds.

3. The device of claim 1 wherein said conduit means is connected to deliver vapor from said vaporizing means to said exhaust system upstream of said vaporizing means.

4. The device of claim 1 and further including air feed means for feeding air through said conduit means along with vapor from said vaporizing means.

5. The device of claim 4 wherein said air feed means includes an air inlet in said vaporizing means whereby air flows into said air inlet and through said vaporizing means to said conduit means.

6. A waste-disposal system including a heat-producing fuel-burning engine having an exhaust system for discharging hot gases from said engine, waste tank means for receiver liquid and organic waste material, vaporizing means for vaporizing said waste material, flow means for feeding waste material from said waste tank means to said vaporizing means, heat transfer means for transferring heat from hot gases flowing through said exhaust system to said vaporizing means to vaporize waste material in said vaporizing means, said vaporizing means having an outlet for vapor produced therein, and air feed means for feeding air through said vaporizing means and out said outlet.

7. A method for disposing of liquid and organic waste material with a system including a heat-producing fuel-burning engine having an exhaust system, a waste tank for receiving waste material and vaporizing means for vaporizing said waste material, comprising the steps of; feeding waste material from said waste tank to said vaporizing means, transferring heat to said vaporizing means from hot gases flowing through said exhaust system to vaporize waste material in said vaporizing means and reduce the temperature of hot gases flowing through said exhaust system downstream of said vaporizing means, and directing vapor from said vaporizing means to a heat source produced by said engine at a temperature substantially greater than the temperature of hot gases flowing through said exhaust system downstream of said vaporizing means.

8. The method of claim 7 wherein said engine includes an exhaust manifold and an intake manifold and said step of feeding vapor from said vaporizing means is carried out by feeding vapor to one of said manifolds.

9. The method of claim 7 and further including the step of feeding air to said heat source along with vapor from said vaporizing means.

10. The method of claim 9 wherein said step of feeding air to said heat source is carried out by first feeding air through said vaporizing means.

11. A method for disposing of liquid and organic waste material with a system including a heat-producing fuel-burning engine having an exhaust system, a waste tank for receiving waste material and vaporizing means for vaporizing said waste material, comprising the steps of; feeding waste material from said waste tank to said vaporizing means, transferring heat to said vaporizing means from hot gases flowing through said exhaust system to vaporize waste material in said vaporizing means, and feeding air to said vaporizing means.

12. The method of claim 11 wherein said vaporizing means has an outlet connected with said exhaust system and said step of feeding air to said vaporizing means is carried out by feeding air through said vaporizing means and out said outlet to said exhaust system.

* * * * *